(12) United States Patent
Lieb et al.

(10) Patent No.: US 6,405,791 B1
(45) Date of Patent: Jun. 18, 2002

(54) AIR HEATER GAS INLET PLENUM

(76) Inventors: Paul James Lieb, 3586 Wadsworth Rd., Norton, OH (US) 44203; Edward J. Piaskowski, 9044 Wall St. NW., Massillon, OH (US) 44646; Norman D. Nelson, 5727 Harter Home Dr., Franklin Township, OH (US) 44319

( * ) Notice: Subject to any disclaimer, the term of this patent is extended or adjusted under 35 U.S.C. 154(b) by 0 days.

(21) Appl. No.: 09/359,098

(22) Filed: Jul. 22, 1999

(51) Int. Cl.[7] .............................. F28F 9/02; F28D 7/00; F24H 3/08
(52) U.S. Cl. ...................... 165/158; 165/174; 165/159; 126/109
(58) Field of Search ................................ 165/158, 174, 165/175, 108, 159; 126/109, 99 C, 99 D; 122/1 A, 1 B, DIG. 1, 2, 420, 421, 20 B, 432, 439; 422/168

(56) References Cited

U.S. PATENT DOCUMENTS

| | | | | |
|---|---|---|---|---|
| 2,146,565 A | * | 2/1939 | Curtis | 122/1 A |
| 2,582,830 A | * | 1/1952 | Hawley | 122/1 A |
| 3,692,096 A | * | 9/1972 | Pettersson et al. | 122/1 A |
| 4,223,722 A | * | 9/1980 | Shade, Jr. | 165/158 |
| 5,086,831 A | * | 2/1992 | Paikert et al. | 165/104.14 |
| 5,293,841 A | * | 3/1994 | Suhr et al. | 122/1 A |
| 5,509,461 A | * | 4/1996 | Williams | 165/4 |

FOREIGN PATENT DOCUMENTS

FR          920812     * 4/1947 ................. 126/109

OTHER PUBLICATIONS

Chapter 34 of *Steam/Its Generation and Use* 40th Edition, Stultz & Kitto, eds., ©1992 The Babcock & Wilcox Company, pp. 34–1 to 34–9.

Excerpt from Chapter 13 of *Steam/Its Generation and Use* 39th Edition, ©1978 The Babcock & Wilcox Company, pp. 13–4 to 13–8.

* cited by examiner

*Primary Examiner*—Henry Bennett
*Assistant Examiner*—Tho Vam Duong
(74) *Attorney, Agent, or Firm*—Eric Marich; Kathryn W. Grant (57) ABSTRACT

A modified air heater gas inlet plenum for a tubular air heater which permits retrofit installation of additional flue gas environmental treatment equipment. A divider plate is located within the inlet plenum to subdivide it into first and second flue gas passages. The first flue gas passage created by the divider plate merely conveys the hot flue gas through the inlet plenum and into flues which convey the flue gas to the new equipment. Return flues convey the flue gas back to the second flue gas passage created in the inlet plenum which, in turn, conveys the flue gas into the tubular air heater heat exchanger tubes. By taking advantage of the large size of a conventional air heater gas inlet plenum, the first and second flue gas passages created by the divider plate still have sufficient cross sectional area so that acceptable flue gas velocities are preserved. One particular application of the modified air heater gas inlet plenum is to permit retrofit application of selective catalytic reduction (SCR) systems for treating flue gas to existing steam generators or boilers.

11 Claims, 7 Drawing Sheets

AIR HEATER GAS INLET PLENUM

FIELD OF THE INVENTION

The present invention relates generally to tubular air heater constructions used in steam generator installations for utility power generation and, more particularly, to an air heater gas inlet plenum for such tubular air heaters which permits retrofit installation of additional flue gas environmental treatment equipment.

BACKGROUND OF THE INVENTION

Increasingly stringent environmental regulations continue to place pressures upon electric utilities which utilize fossil-fueled steam generators to produce electricity. However, modifications to existing steam generators is often problematic due to the limited space available, and the utilities' desire to make such modifications in an efficient manner and at minimum cost.

Many fossil-fueled steam generators used for utility power generation employ recuperative tubular air heaters to transfer heat from the hot flue gases produced during combustion into the incoming combustion air. After this heat exchange process has occurred, the flue gases are eventually conveyed into the atmosphere via a stack. Various types of environmental cleanup equipment are also often provided in between the flue gas outlet of such steam generators and the stack, such as precipitators for particulate control and wet or dry flue gas desulfurization systems.

In addition to controlling sulphur oxide emissions, nitrogen oxides are one of the primary pollutants emitted during combustion processes. As described in Chapter 34 of *Steam/ its generation and use*, 40th Edition, Stultz and Kitto, editors, Copyright©1992 The Babcock & Wilcox Company, at pages 34-1 to 34-9, various methods are used to control nitrogen oxide emissions. One method involves selective catalytic reduction (SCR) systems which catalytically reduce flue gas $NO_x$ to $N_2$ and $H_2O$ using ammonia in a chemical reduction. For further details concerning the basic principles behind SCR systems, the reader is referred to the aforementioned Chapter 34 of *Steam*, the text of which is hereby incorporated by reference as though fully set forth herein.

SCR reactions take place within an optimal temperature range, and the SCR modules used in such systems are typically located downstream of the economizer gas outlet of the steam generator or boiler and upstream (with respect to a direction of flue gas flow through the steam generator) of the air heater devices used to preheat the incoming combustion air. Retrofit applications of SCR systems to steam generators having tubular air heaters present their own particular problems.

Figure 1:
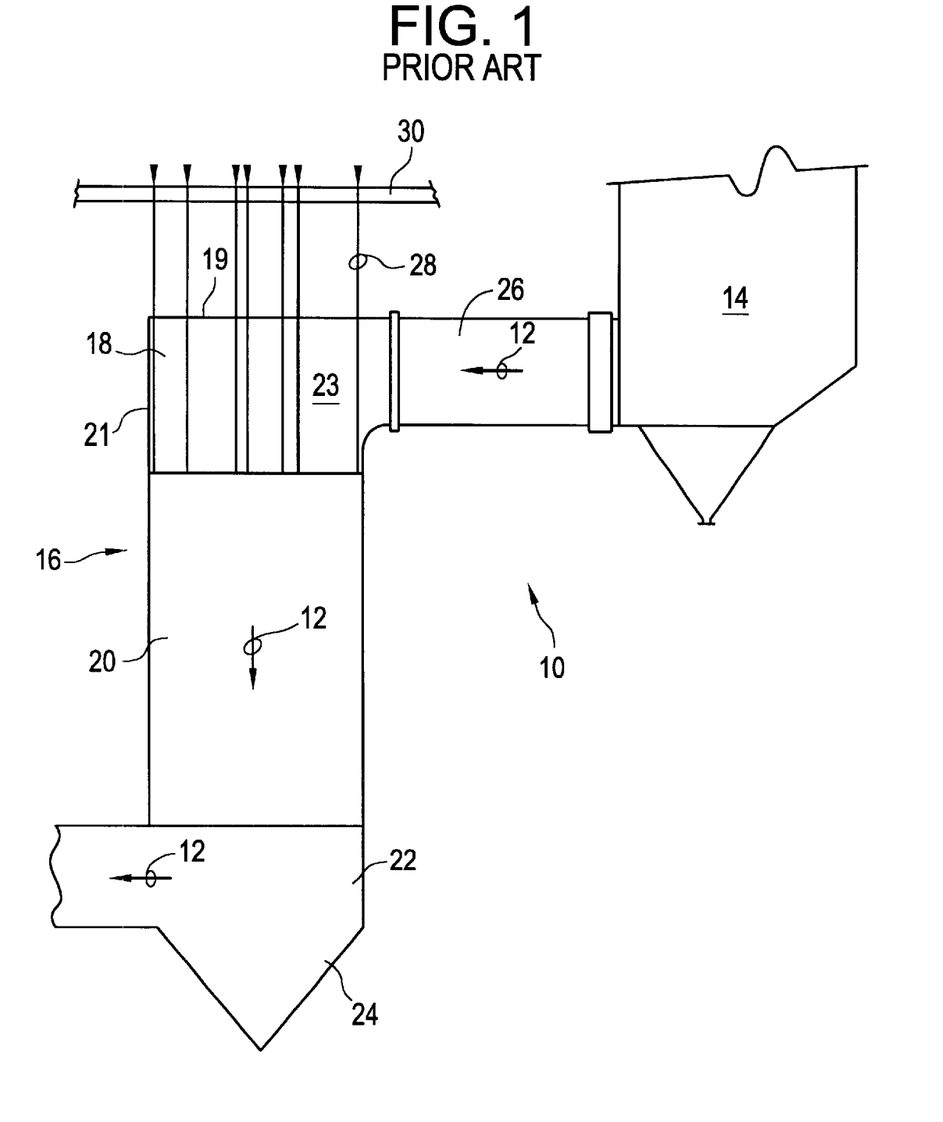
FIG. 1 is a schematic sectional side view illustration of a known tubular air heater arrangement having a single gas downflow pass.
Figure 2:
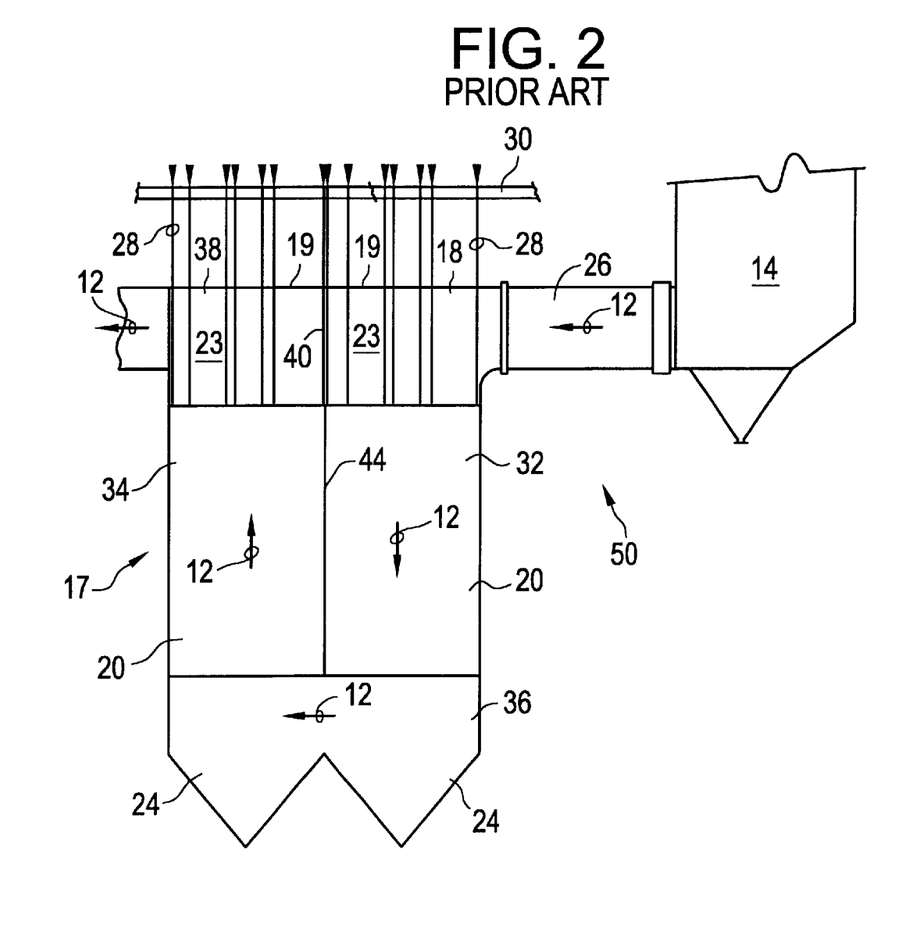
FIG. 2 is a schematic sectional side view illustration of another known tubular air heater arrangement having a gas downflow and a gas upflow pass.

Referring generally to FIGS. 1 and 2 of the present disclosure, there are shown two such typical installations of tubular air heaters as provided at the economizer gas outlet of a utility steam generator (not shown).

FIG. 1 illustrates a first embodiment of a known tubular air heater installation, generally designated 10. Hot flue gas 12 provided from a boiler economizer gas outlet 14 is conveyed to a tubular air heater 16 for transferring heat from the hot flue gases 12 into incoming combustion air (not shown). Tubular air heater 16 is generally provided with a large gas inlet plenum 18 located at an upper end of the tubular air heater 16 and above a plurality of heat exchanger tubes 20 for receiving and conveying the hot flue gas 12 therethrough while the air for combustion (not shown) passes there across over the outside surfaces of these tubes 20 in a heat exchange relationship. The large gas inlet plenum 18 has a top wall 19, a rear wall 21, and side walls 23.

The hot flue gases 12 are cooled as they pass downwardly through the tubular air heater 16, conveying the heat contained therein to the combustion air. A gas outlet plenum 22 is generally provided at the bottom of the tubular air heater 16 for collecting and conveying the flue gases 12 to a stack (not shown). Since the flue gases 12 contain significant amounts of flyash, a hopper 24 may be provided at a lower portion of the gas outlet plenum to collect flyash particles. As illustrated in the arrangement of FIG. 1, the hot flue gas 12 is conveyed from the boiler economizer gas outlet 14 via an outlet gas flue 26 into the gas inlet plenum 18 where the flue gases make a 90° turn downwardly into the plurality of heat exchanger tubes 20 and, after exiting therefrom, make another 90° turn at the gas outlet plenum 22 before exiting the tubular air heater 16. The tubular air heater 16 is generally top supported via support rods 28 which are hung from top support steel 30, but it may be bottom supported as well.

Various other arrangements of tubular air heaters are known. For particular details of such arrangements, the reader is referred to Chapter 13 of *Steam/ its generation and use*, 39th edition, Copyright©1978 by The Babcock & Wilcox Company, particularly pages 13-4 to 13-8, and that chapter is hereby incorporated by reference as though fully set forth herein. FIG. 2 illustrates one such variation, generally designated 50. Throughout FIGS. 1 and 2, as well as in the balance of the present disclosure, like reference numerals designate the same or functionally similar elements throughout the several drawings. In the arrangement of FIG. 2, the hot flue gases 12 are again conveyed from the boiler economizer gas outlet 14 into an upper plenum 18 of a U-shaped tubular air heater, generally designated 17. As shown therein, tubular air heater 17 is provided with a gas downflow section 32 and a gas upflow section 34 containing heat exchanger tubes 20. While the hot flue gas 12 makes a 90° turn downward into the gas downflow section 32, at the bottom portion thereof the hot flue gases 12 make a 180° turn up into the gas upflow section 34 by means of an intermediate gas plenum 36. If desired, hoppers 24 may again be provided to collect particles from the hot flue gas 12 as it makes the 180° turn within the intermediate gas plenum 36. After passing upwardly through the heat exchanger tubes 20 comprising the gas upflow section 34, the hot flue gases 12 make another 90° turn in a gas outlet plenum 38 located at an upper portion of the gas upflow section 34. The hot flue gases 12 then exit from the tubular air heater 17 for eventual exhaust into the atmosphere. At the upper portion of the tubular air heater 17 a flue gas impermeable wall 40 separates the gas inlet plenum 18 from the gas outlet plenum 38. Similarly, flue gases conveyed downwardly through gas downflow section 32 and upwardly through gas upflow section 34 are separated from one another by another flue gas impermeable wall 44.

It will thus be readily appreciated that retrofit installation of SCR equipment so that the flue gas 12 exiting from the boiler economizer gas outlet 14 can be treated prior to entry into the tubular air heater configurations illustrated in FIGS. 1 and 2 can present significant arrangement problems. The present invention provides a solution with a minimum of cost and modification.

SUMMARY OF THE INVENTION

The present invention involves modifications to an air heater gas inlet plenum for a tubular air heater to permit retrofit installation of additional flue gas environmental treatment equipment, such as selective catalytic reduction (SCR) systems for treating flue gas. A divider plate is located within the inlet plenum to subdivide it into first and second flue gas passages. The first flue gas passage created by the divider plate merely conveys the hot flue gas through the inlet plenum and into flues which convey the flue gas to the new equipment. Return flues convey the flue gas back to the second flue gas passage created in the inlet plenum which, in turn, conveys the flue gas into the tubular air heater heat exchanger tubes. By taking advantage of the large size of a conventional air heater gas inlet plenum, the. first and second flue gas passages created by the divider plate still have sufficient cross sectional area so that acceptable flue gas velocities are preserved.

Accordingly, one aspect of the present invention is drawn to a tubular air heater for transferring heat from hot flue gas into air. The tubular air heater comprises a plurality of heat exchanger tubes for conveying the hot flue gas therethrough and the air there across in heat exchange relationship. In addition, there is provided an inlet plenum means for receiving the hot flue gas, the inlet plenum means being subdivided by divider plate means therein into a first and a second flue gas passage, the first flue gas passage for conveying the hot flue gas through the inlet plenum means while preventing the hot flue gas from entering the plurality of heat exchanger tubes, the second flue gas passage for conveying the hot flue gas into the plurality of heat exchanger tubes.

Another aspect of the present invention is drawn to a gas inlet plenum for a tubular air heater having a plurality of heat exchanger tubes for conveying hot flue gas therethrough and air there across in heat exchange relationship. The gas inlet plenum comprises divider plate means therein for subdividing the gas inlet plenum into a first and a second flue gas passage. The first flue gas passage is for conveying hot flue gas from a first flue gas inlet of the gas inlet plenum through the gas inlet plenum to a flue gas outlet while preventing the hot flue gas from entering the plurality of heat exchanger tubes. The second flue gas passage is for conveying the hot flue gas from a second flue gas inlet of the gas inlet plenum into the plurality of heat exchanger tubes.

Yet another aspect of the present invention is drawn to a method of modifying a gas inlet plenum for a tubular air heater to permit retrofit installation of additional flue gas treatment equipment in between a boiler economizer gas outlet and the tubular air heater. As described above, the gas inlet plenum is fluidically connected to a plurality of heat exchanger tubes of the tubular air heater for conveying hot flue gas therethrough and air there across in heat exchange relationship, and has a first flue gas inlet, a rear wall, and side walls. The method involves modifying at least one of the rear wall and the side walls of the gas inlet plenum to provide a flue gas outlet and a second flue gas inlet therein. In addition, the method involves installing divider plate means into the gas inlet plenum for subdividing the gas inlet plenum into a first and a second flue gas passage. The first flue gas passage is for conveying hot flue gas from the first flue gas inlet of the gas inlet plenum through the gas inlet plenum to a flue gas outlet while preventing the hot flue gas from entering the plurality of heat exchanger tubes. The second flue gas passage is for conveying the hot flue gas from the second flue gas inlet of the gas inlet plenum into the plurality of heat exchanger tubes.

Yet another aspect of the above method involves modifying at least one of the rear wall and the side walls of the gas inlet plenum to provide plural flue gas outlets and plural flue gas inlets therein. The divider plate means are installed to subdivide the gas inlet plenum into a first and second flue gas passage, the first flue gas passage for conveying hot flue gas from the first flue gas inlet of the gas inlet plenum to the plural flue gas outlets while preventing the hot flue gas from entering the plurality of heat exchanger tubes, the second flue gas passage for conveying the hot flue gas from the plural second flue gas inlets of the gas inlet plenum into the plurality of heat exchanger tubes.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENTS

Figure 3:
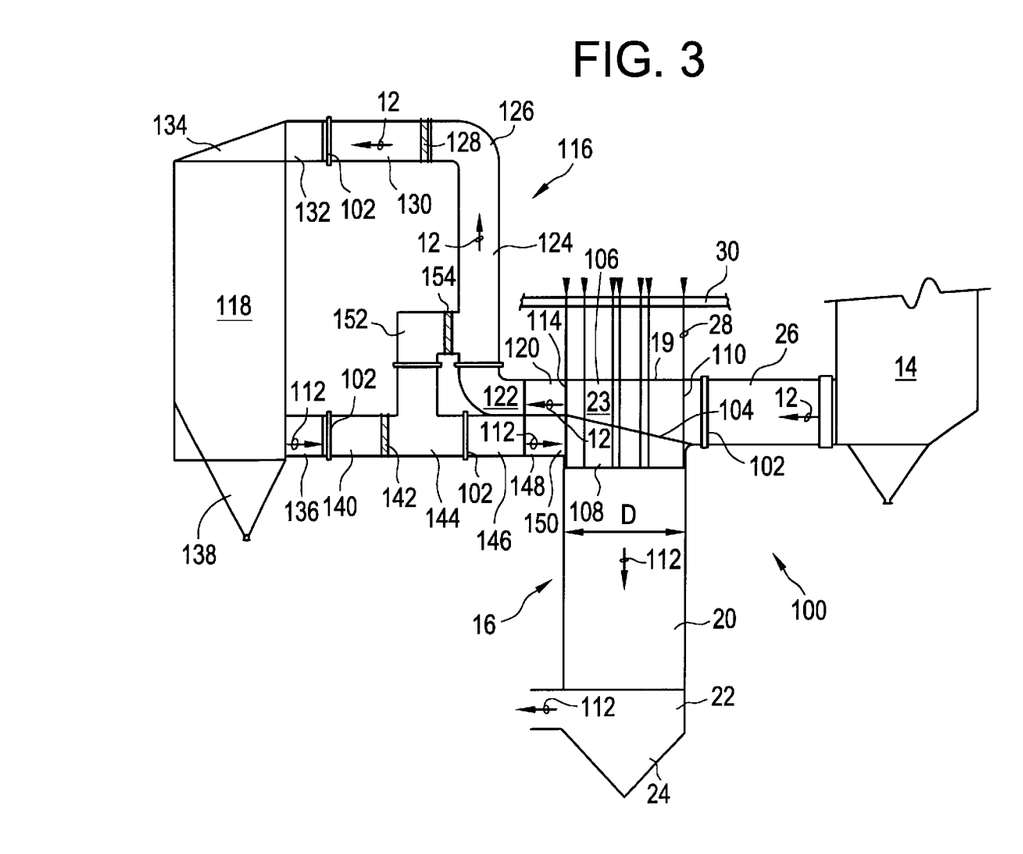
FIG. 3 is a schematic sectional side view illustration of a first embodiment of a modified gas inlet plenum for a tubular air heater according to the present invention, as applied to the retrofit application of an SCR system to an existing tubular air heater installation of the type shown in FIG. 1.
Figure 4:
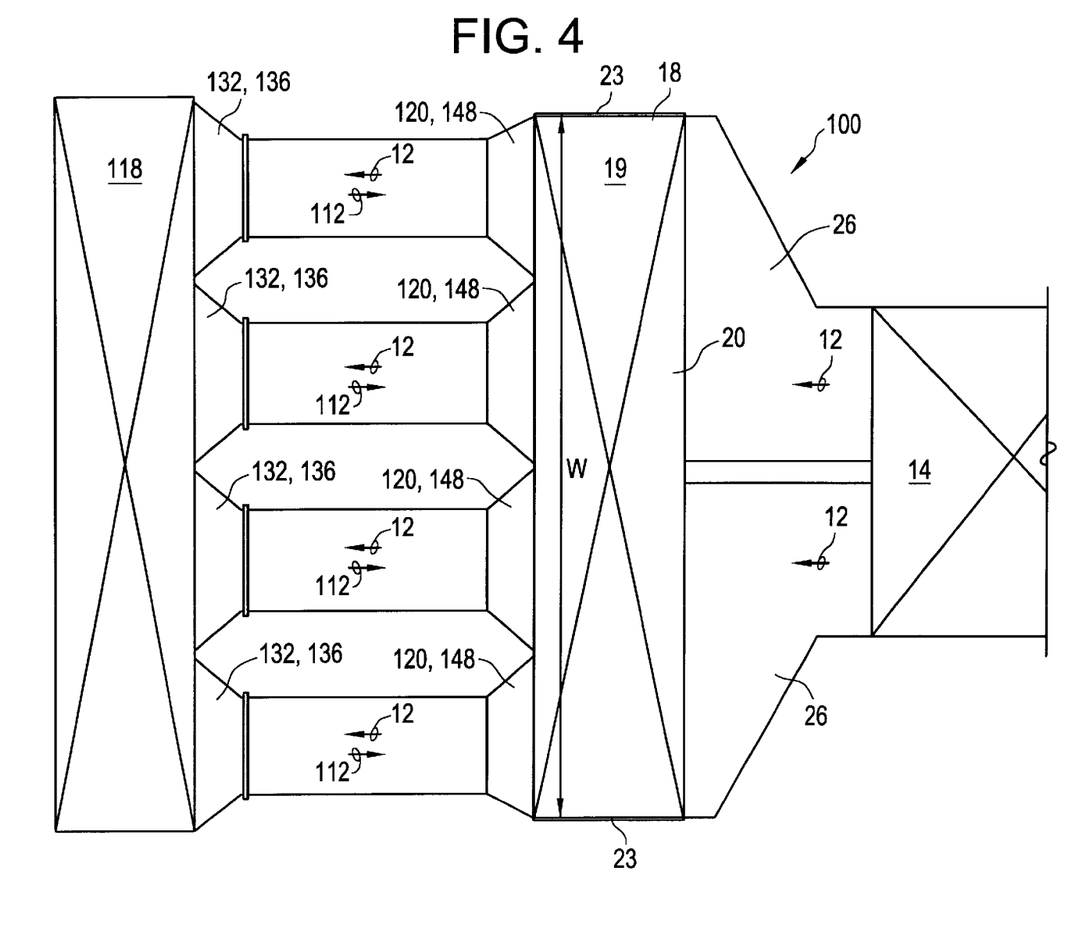
FIG. 4 is a schematic plan view of a portion of the first embodiment of FIG. 3.

Throughout the drawings of the present disclosure, like reference numerals designate the same or functionally similar elements throughout the several drawings. FIG. 3 illustrates a schematic sectional side view illustration of a first embodiment of a modified gas inlet plenum, generally designated 100, for a tubular air heater according to the present invention, and as applied to a retrofit application of an SCR system to an existing tubular air heater installation of the type shown in FIG. 1 used with a steam generator (not shown). FIG. 4 is a schematic plan view of a portion of the first embodiment of FIG. 3.

It will be appreciated by those skilled in the art that the concepts of the present invention are not limited to accommodating only SCR systems to such installations. The modification or provision of a gas inlet plenum for a tubular air heater according to the present invention can also permit a simple and efficient installation of electrostatic precipitators (ESPs) or other types of flue gas treatment or conditioning equipment downstream (with respect to a direction of flue gas flow) of an economizer gas outlet and upstream (again with respect to a direction of flue gas flow) of the tubular air heater.

Referring to FIGS. 3 and 4, and as shown therein, the modified gas inlet plenum 100 is provided at an upper end of a tubular air heater 16 with a single downflow gas pass. The tubular air heater 16 contains heat exchanger tubes 20 which convey hot flue gas therethrough while air to be heated flows across the outside surfaces of the tubes 20. For the sake of simplicity, these FIGS. 3 and 4, as well as those that follow, do not illustrate the various duct work which would convey the air to and from the tubular air heater 16. Tubular air heater 16 has a depth D and a width W. The modified air heater gas inlet plenum 100 can be considered to have substantially the same overall dimensions.

The modified air heater gas inlet plenum or inlet plenum means 100 is located at an upper end of the tubular air heater 16 and receives hot flue gas 12 from an economizer gas outlet 14 via an outlet gas flue 26. As illustrated in the drawings, various expansion joints 102 of known construction may be provided to accommodate thermal expansion and contraction of the flues. In accordance with the present invention, the inlet plenum means 100 is subdivided by divider plate means 104 located therein into first and second flue gas passages, 106, 108, respectively. In this embodiment, the first flue gas passage 106 is located above the second flue gas passage 108, the divider plate means 104 extending within the inlet plenum means 100 substantially across the width W and depth D of the tubular air heater 16 between the two flue gas passages 106, 108. In this case, the divider plate means 104 is substantially planar, and is inclined slightly with respect to the horizontal to facilitate conveyance of the flue gas through the flue gas passages 106, 108 as well as interconnection to adjacent flues as will be described below.

The hot flue gas 12 enters an inlet end 110 of the first flue gas passage 106, but since the divider plate means 104 is present, the hot flue gas is conveyed through the inlet plenum means 100, without passing through the heat exchanger tubes 20. Instead, the hot flue gas 12 exits out through an outlet end 114 of the first flue gas passage 106 to a system of flues, generally designated 116, which conveys the flue gas 12 to an SCR system 118 and then back to the tubular air heater 16. In the following discussion, the hot flue gas which has yet to reach the SCR system 118 is designated 12; hot flue gas returning from the SCR system 118 (or bypassed there around as discussed later) is designated 112.

As illustrated in FIGS. 3 and 4, such a system of flues 116 in a typical installation which would convey the hot flue gas 12 to the SCR system 118 might comprise one or more gas outlet flues 120, elbows 122, straight flue sections 124, elbows 126, isolation dampers 128, straight flue sections 130, and SCR gas inlet flues 132 which are connected to an SCR gas inlet plenum 134 located at an upper end of the SCR system 118. After the hot flue gas 12 is treated by the SCR system 118, it is conveyed out of a lower end of the SCR system 118 through one or more SCR gas outlet flues 136 for return to the tubular air heater 16. A hopper 138 may be provided at a lower end of the SCR system 118 to collect particulates in the hot flue gas 12, 112.

The flues in such a system 116 which would convey the hot flue gas 112 from the SCR system 118 back to the tubular air heater 16 might comprise one or more straight flue sections 140, isolation dampers 142, TEE sections 144, straight flue sections 146, and gas inlet flues 148 connected to an inlet 150 of the second flue gas passage 108. The second flue gas passage 108 then conveys the hot flue gas 112 down into the plurality of heat exchanger tubes 20 contained within the tubular air heater 16.

As further illustrated in FIG. 3, the TEE sections 144, together with a corner flue 152, another isolation damper 154, and the isolation damper 128, can be used to bypass the hot flue gas around the SCR system 118. In a bypass condition, isolation dampers 128 and 142 would be closed, and isolation damper 154 would be open. During normal SCR system 118 operation, isolation dampers 128 and 142 would be open, and isolation damper 154 would be closed.

Figure 5:
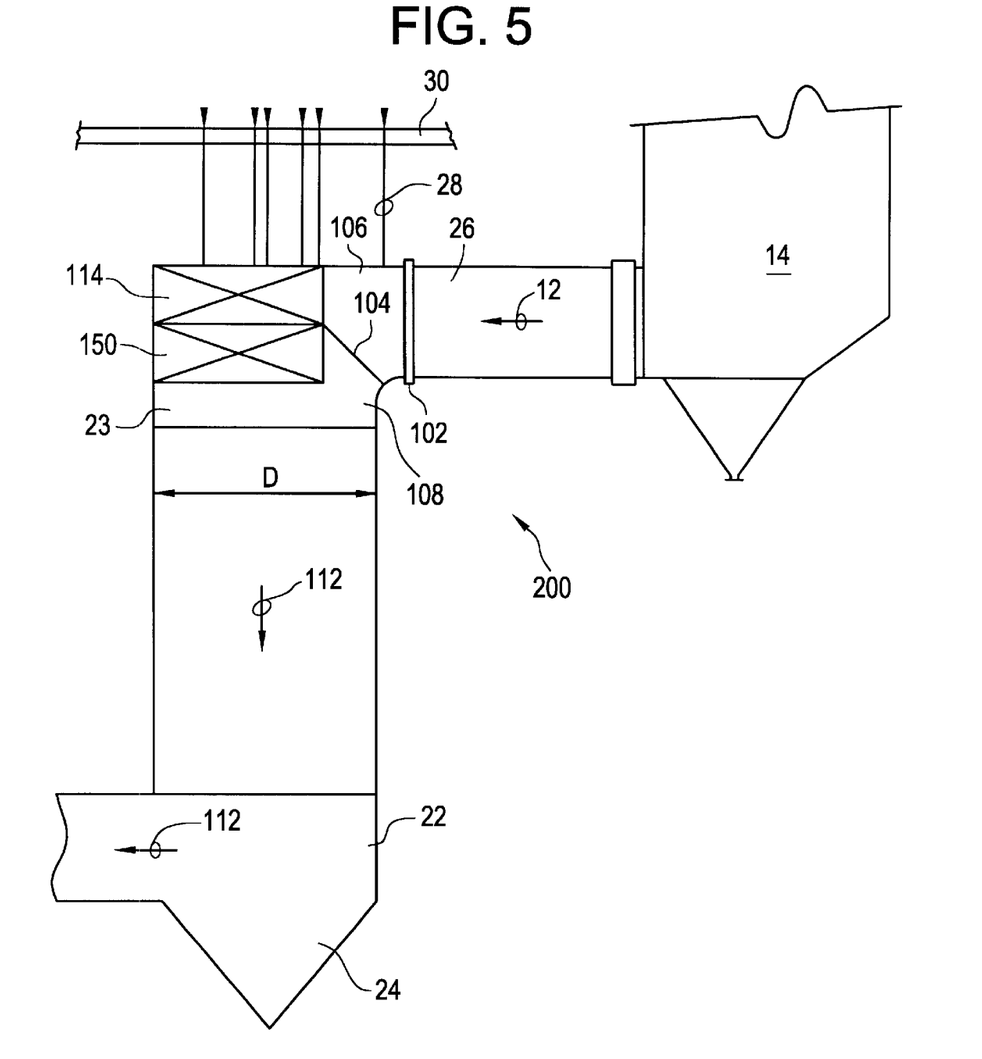
FIG. 5 is a schematic sectional side view illustration, similar to that shown in FIG. 1, of a second embodiment of a modified gas inlet plenum for a single gas downflow pass tubular air heater according to the present invention, having single or plural side flue gas outlets from the gas inlet plenum and single or plural side flue gas inlets to the gas inlet plenum.

FIG. 5 is a schematic sectional side view illustration, similar to that shown in FIG. 1, of a second embodiment of a modified gas inlet plenum for a single gas downflow pass tubular air heater 16 according to the present invention, generally designated 200, having single or plural side flue gas outlets 114 from the gas inlet plenum 200 and single or plural side flue gas inlets 150 to the gas inlet plenum 200, which also facilitates the retrofit application of an SCR system 118 to such an existing tubular air heater installation.

In the embodiment of FIG. 5, the divider plate means 104 is again provided to subdivide the air heater gas inlet plenum 200 into the first and second flue gas passages 106, 108, but in this case the divider plate means 104 is segmented. However, the divider plate means 104 still extends within the inlet plenum means 200 substantially across a width W and depth D of the tubular air heater 16 between the two flue gas passages 106, 108.

Figure 6:
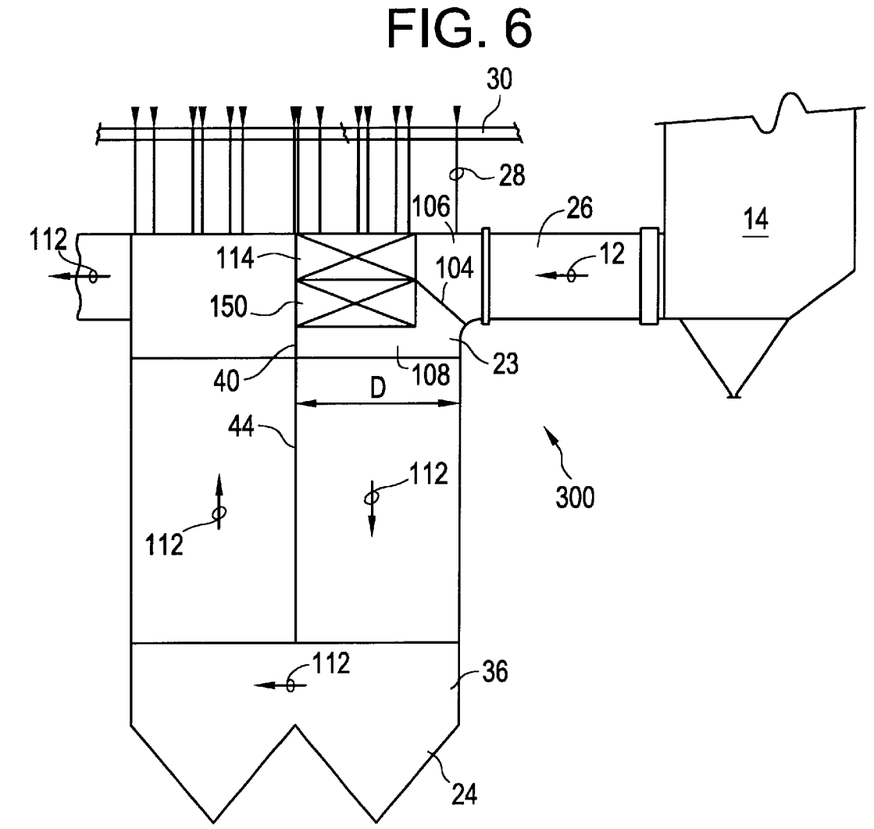
FIG. 6 is a schematic sectional side view illustration, similar to that shown in FIG. 3, of a third embodiment of a modified gas inlet plenum for a tubular air heater having gas downflow and gas upflow passes according to the present invention, having single or plural side flue gas outlets and single or plural side flue gas inlets to the gas inlet plenum.

FIG. 6 is a schematic sectional side view illustration, similar to that shown in FIG. 3, of a third embodiment of a modified gas inlet plenum for a tubular air heater having gas downflow and gas upflow passes according to the present invention, generally designated 300, having single or plural side flue gas outlets 114 from the gas inlet plenum 300 and single or plural side flue gas inlets 150 to the gas inlet plenum 300, which also facilitates the retrofit application of an SCR system to such an existing tubular air heater installation. Again, in this case the divider plate means 104 is segmented and extends within the inlet plenum means 300 substantially across a width W and depth D of the tubular air heater 16 between the two flue gas passages 106, 108.

In the embodiments of FIGS. 5 and 6, if performance characteristics permit, the flue gas passage 106 may be provided with a single flue gas outlet 114 on a side 23 of the gas inlet plenum 200, 300, while the flue gas passage 108 may be provided with a single flue gas inlet 150 on the same side 23 of the gas inlet plenum 200, 300. It is also possible to provide one flue gas outlet 114 and one flue gas inlet 150 on opposite sides 23 of the gas inlet plenum 200, 300, depending upon the requirements of a given installation.

Figure 7:
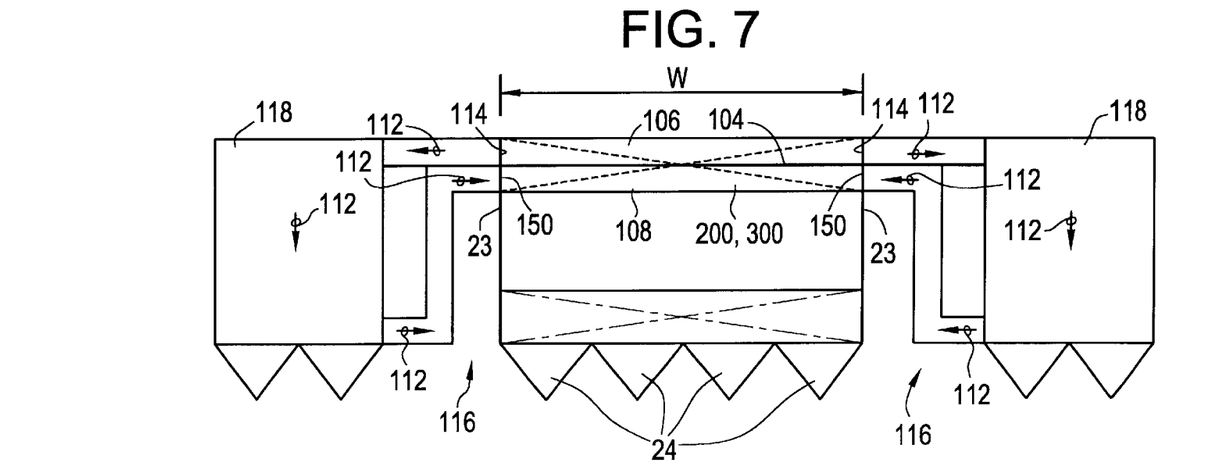
FIG. 7 is a schematic sectional front view of the second embodiment of FIG. 5, as well as the third embodiment of FIG. 6.
Figure 8:
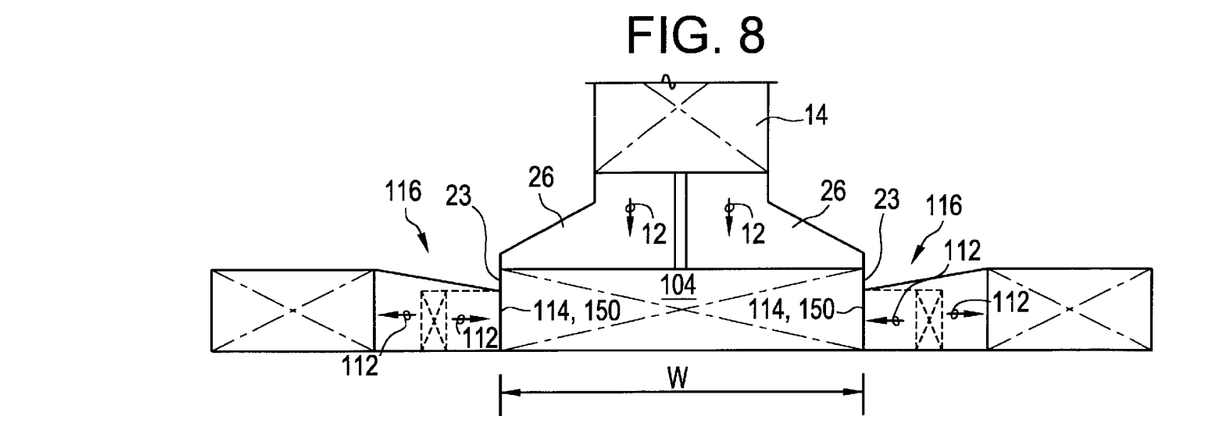
FIG. 8 is a schematic plan view of FIG. 7.

However, it is envisioned that typical installations will be symmetrical, as illustrated in FIGS. 7 and 8, with flue gas outlets 114 and inlets 150 on both sides of the gas inlet plenum 200, 300. FIG. 7 is a schematic sectional front view of the second embodiment of FIG. 5, and it can also be visualized as being a similar view of the third embodiment of FIG. 6. FIG. 8 is a schematic plan view of FIG. 7, and given that only a single flue gas pass tubular air heater 16 is depicted, it would only be applicable to FIG. 5. Such symmetrical arrangements are particularly suitable for situations where the SCR system 118 must be broken into two portions, one on either side of the tubular air heater 16.

While specific embodiments of the invention have been shown and described in detail to illustrate the application of the principles of the invention, those skilled in the art will appreciate that changes may be made in the form of the invention covered by the following claims without departing from such principles. For example, the present invention may be applied to new construction involving tubular air heaters, or to the replacement, repair, or reconstruction of existing tubular air heater installations. The principles of the present invention likewise equally apply to top-supported or bottom-supported tubular air heater constructions and installations. In some embodiments of the invention, certain features of the invention may sometimes be used to advantage without a corresponding use of the other features. Accordingly, all such changes and embodiments properly fall within the scope and equivalents of the following claims.

We claim:

1. A tubular air heater for transferring heat from hot flue gas into air, comprising:
    a plurality of heat exchanger tubes for conveying the hot flue gas therethrough and the air there across in heat exchange relationship; and
    inlet plenum means, located at an upper end of the tubular air heater, for receiving the hot flue gas, the inlet plenum means being subdivided by divider plate means therein into a first flue gas passage for providing hot flue gas to flue gas environmental treatment equipment and a second flue gas passage for receiving hot flue gas from the flue gas environmental treatment equipment, the first flue gas passage for conveying the hot flue gas through the inlet plenum means while preventing the hot flue gas from entering the plurality of heat exchanger tubes, the second flue gas passage for conveying the hot flue gas into the plurality of heat exchanger tubes; and
        wherein the first flue gas passage is located next to the second flue gas passage, the divider plate means extending within the inlet plenum means substantially across a width and depth of the tubular air heater between the two flue gas passages.

2. The tubular air heater according to claim 1, wherein the tubular air heater comprises a single gas downflow pass.

3. A tubular air heater for transferring heat from hot flue gas into air, comprising:
    a plurality of heat exchanger tubes for conveying the hot flue gas therethrough and the air there across in heat exchange relationship;
    inlet plenum means, located at an upper end of the tubular air heater, for receiving the hot flue gas, the inlet plenum means being subdivided by divider plate means therein into a first flue gas passage for providing hot flue gas to flue gas environmental treatment equipment and a second flue gas passage for receiving hot flue gas from the flue gas environmental treatment equipment, the first flue gas passage for conveying the hot flue gas through the inlet plenum means while preventing the hot flue gas from entering the plurality of heat exchanger tubes, the second flue gas passage for conveying the hot flue gas into the plurality of heat exchanger tubes; and
        wherein the first flue gas passage is located above the second flue gas passage, the divider plate means extending within the inlet plenum means substantially across a width and depth of the tubular air heater between the two flue gas passages.

4. The tubular air heater according to claim 3, wherein the tubular air heater comprises a single gas downflow pass.

5. A gas inlet plenum for a tubular air heater having a plurality of heat exchanger tubes for conveying hot flue gas therethrough and air there across in heat exchange relationship, comprising:
    divider plate means therein for subdividing the gas inlet plenum into a first and a second flue gas passage, the first flue gas passage conveying hot flue gas from a first flue gas inlet of the gas inlet plenum through the gas inlet plenum to a flue gas outlet for providing hot flue gas to a selective catalytic reactor while preventing the hot flue gas from entering the plurality of heat exchanger tubes, the second flue gas passage conveying the hot flue gas from a second flue gas inlet of the gas inlet plenum for receiving hot flue gas from the selective catalytic reactor into the plurality of heat exchanger tubes; and
    means connected to the first and second flue gas passages for bypassing the hot flue gas around the selective catalytic reactor.

6. The gas inlet plenum for a tubular air heater according to claim 5, comprising:
    divider plate means for subdividing the gas inlet plenum into plural first and second flue gas passages, the plural first flue gas passages for conveying hot flue gas from plural first flue gas inlets of the gas inlet plenum through the gas inlet plenum to plural flue gas outlets while preventing the hot flue gas from entering the plurality of heat exchanger tubes, the plural second flue gas passages for conveying the hot flue gas from plural second flue gas inlets of the gas inlet plenum into the plurality of heat exchanger tubes.

7. The gas inlet plenum for a tubular air heater according to claim 6, wherein the plural first flue gas inlets of the gas inlet plenum are located on sides of the gas inlet plenum and the plural first flue gas passages convey the hot flue gas through the gas inlet plenum from the plural first flue gas inlets to the plural flue gas outlets while preventing the hot flue gas from entering the plurality of heat exchanger tubes.

8. The gas inlet plenum for a tubular air heater according to claim 6, wherein the plural second flue gas inlets are located on sides of the gas inlet plenum and the plural second flue gas passages convey the hot flue gas from the plural second flue gas inlets into the plurality of heat exchanger tubes.

9. The gas inlet plenum for a tubular air heater according to claim 5, wherein the first flue gas passage is located next to the second flue gas passage, the divider plate means extending within the gas inlet plenum substantially across a width and depth of the tubular air heater between the two flue gas passages.

10. The gas inlet plenum for a tubular air heater according to claim 5, wherein the first flue gas passage is located above the second flue gas passage, the divider plate means extending within the gas inlet plenum substantially across a width and depth of the tubular air heater between the two flue gas passages.

11. A tubular air heater for transferring heat from hot flue gas into air, comprising:
    a plurality of heat exchanger tubes for conveying the hot flue gas therethrough and the air there across in heat exchange relationship;

inlet plenum means for receiving the hot flue gas, the inlet plenum means being subdivided by divider plate means therein into a first flue gas passage for providing hot flue gas to a selective catalytic reactor and a second flue gas passage for receiving hot flue gas from the selective catalytic reactor, the first flue gas passage for conveying the hot flue gas through the inlet plenum means while preventing the hot flue gas from entering the plurality of heat exchanger tubes, the second flue gas passage for conveying the hot flue gas into the plurality of heat exchanger tubes; and means connected to the first and second flue gas passages for bypassing the hot flue gas around the selective catalytic reactor.

* * * * *